United States Patent
Atkinson et al.

(10) Patent No.: US 6,305,415 B1
(45) Date of Patent: Oct. 23, 2001

(54) FLUIDIC PRESSURE REGULATOR

(75) Inventors: Louis D. Atkinson, 12535 W. Wilbur, New Berlin, WI (US) 53151; Shane T. Bloomer, New Berlin, WI (US)

(73) Assignee: Louis D. Atkinson, New Berlin, WI (US)

( * ) Notice: Subject to any disclaimer, the term of this patent is extended or adjusted under 35 U.S.C. 154(b) by 0 days.

(21) Appl. No.: 09/552,116

(22) Filed: Apr. 19, 2000

(51) Int. Cl.[7] .................................................. G05D 16/02
(52) U.S. Cl. .................................. 137/505.18; 137/505.41
(58) Field of Search ........................ 137/505.18, 505.41, 137/505.42

(56) References Cited

U.S. PATENT DOCUMENTS

| | | | | |
|---|---|---|---|---|
| 1,267,281 | * | 5/1918 | Schneider | 137/505.18 |
| 1,525,426 | * | 2/1925 | Mueller et al. | 137/505.18 |
| 2,487,089 | * | 11/1949 | Anthes | 137/505.18 X |
| 3,782,858 | * | 1/1974 | Deters | 137/505.41 X |

* cited by examiner

Primary Examiner—Stephen M. Hepperle
(74) Attorney, Agent, or Firm—Andrus, Sceales, Starke & Sawall

(57) ABSTRACT

A fluid pressure regulator is disclosed including a valve body and a control body sealed within a tubular outer housing. The valve body has a supply chamber and an output chamber separated by a valve wall. A valve rod extends through the valve wall with a seal unit therebetween for selectively connecting a passageway associated with the valve rod between the supply chamber and the output chamber. The output chamber has a movable wall connected to the rod. A control chamber is secured within the tubular housing in spaced relation to said movable wall with the space between the movable wall and the control chamber connected to atmosphere. The control chamber has a control rod with an adjustable bias spring urging the rod outwardly into engagement with the movable wall. A balance pressure passageway is formed by a lateral passageway from the supply chamber and from the control chamber with a passageway formed between the bodies and the tubular housing to connect said lateral passageway and maintain both chambers at the same pressure. The rod is formed in association with a movable sealing wall and seal member to provide various passageway constructions.

16 Claims, 5 Drawing Sheets

FLUIDIC PRESSURE REGULATOR

BACKGROUND OF THE PRESENT INVENTION

The present invention relates to a precision fluidic pressure regulator and particularly to a reliable subminiature fluidic pressure regulator.

Fluidic pressure regulators are widely used for transferring and controlling of a controlled pressure from a supply source to an output or load device. Pneumatic and other fluidic systems are widely known and applied in both control and regulating fields. There is a particular need for a small fluidic pressure regulator which can maintain a given secondary or output pressure with changes in the primary or supply pressure furnished from a pressure source. There is a further need for a design and construction of pressure regulators of subminiature size which can provide the desired regulation for normal flow applications and also for dead ended applications with a varying pressure source. A non-bleed and non-relieving fluidic pressure regulator is desirable because it permits the use of a limited supply source such as a pressurized pneumatic tank or cartridge, without wasting of any of the source fluid and pressure while maintaining the desired output pressure characteristic.

SUMMARY OF THE PRESENT INVENTION

The present invention provides a pressure regulator with a fluidic valve which can be constructed and operated advantageously for the non-bleed, non-relieving type of a load system as well as in a bleed, relieving application. It has been particularly applied in "dead-ended" applications from a varying pressurized pneumatic tank or cartridge with an essentially constant output level with changes in the supply pressure at the input side of the regulator.

Generally in accordance with the present invention, the pressure regulator includes a valve assembly including a supply chamber and an output chamber separated by a valve unit. The output chamber has a movable wall, preferably provided at one end of the output chamber. The valve unit includes a valved passageway connected between the supply chamber and the output chamber of the valve assembly. A movable valve member is connected to the movable wall and is operable to open and close the valved passageway of the valve unit, and thereby provide a transfer of the pressurized supply from the input to the output chamber. A closed control chamber is located adjacent said valve assembly and output chamber and includes a control pressure chamber within which an adjustable control member is located. The control member includes a member extended from the chamber and connected to the movable wall and is configured for resiliently biasing of the movable wall to place the movable valve member to open the valved passageway and thereby provide for transfer of pressure to the output chamber which is then operable to increase the pressure in the output chamber and reset the movable wall and the control member to close the valved passageway.

In accordance with one significant feature of the invention, a pressure balancing passageway connects the supply chamber to the control chamber to maintain a corresponding pressure state in both chambers. The output thereby is controlled by the control mechanism of the control chamber biasing and setting of the movable wall and its interconnection to the valve element or member of the valve unit.

In a preferred construction, the movable wall includes a flexible diaphragm which is clamped between a valve body and a control body and defines the outer wall of the output chamber. The valve body and control body are contained within an outer tubular housing to support the same in predetermined relation. The movable wall defines the outer wall of the output chamber, with the connection between the valve body and control body connected to reference such as atmosphere. The valve unit includes a valve wall within the valve body spaced from the movable wall and defining a supply chamber and an output chamber which includes the movable wall. The valve wall includes a central seal element with a valve rod passing through the seal element and with the one end connected to the movable wall. The valve rod forms a passageway with opposite ends and with the first end aligned with the seal element within the valve wall in the closed position. The send end of the passageway is connected to the output chamber. The valve rod may be formed with various structures to form the fluid connection between the input and output chamber. The seal element within the valve wall is preferably a resilient annular member with the valve rod passing therethrough and sealably engaging the surface of the valve rod, and particularly the first end of the valve rod.

The control chamber has an outer wall spaced from the valve body and with a control rod passing through an annular seal to maintain a sealed control chamber. The outer end of the control rod is connected to the movable wall. A spring or other suitable bias system, where an adjustable control is provided, is mounted within the sealed control chamber and coupled to the control rod to selectively bias the rod and the interconnected movable wall inwardly of the output chamber. Equalized pressure between the supply chamber and the control chamber is established by a passageway extended between the respective valve body and the control body which results in the movable wall being positioned in accordance with the setting of the bias system connected to the control rod. This preferred system has been found to provide a highly effectively miniature pneumatic valve structure from both the operating and cost requirements.

The valve elements may be readily formed of suitable plastics which are readily assembled to form various sized valve units and is particularly adapted for construction of relative small pressure regulators. In practice, a subminiature valve having a rectangular construction and with an adjustable unit has been constructed having a measurement of an inch in length and one-half inch square. A fixed and nonadjustable unit has been readily constructed with a generally rectangular configuration having a length of approximately five-eighths inch and one-half inch square cross section. These dimensions can readily be varied within a reasonable range from the typical examples.

The above structure is in contrast to the generally present round or cylinder construction of one and three quarter inches and one and one quarter inches for standard fixed versions, and two and one quarter and one and one quarter inches for adjustable version.

The present invention is, in summary, readily, and at a significant effect cost, constructed in various sizes and with a fixed or adjustable preset pressure versions. The regulator may be formed with a wide range of pressure ratings and typically for 200 PSI, 500 PSI, 2500 PSI and larger. The regulator may be of a nonbleed/nonrelieving type or a constant bleed, relieving type.

The present invention thus particularly provides an available small compact pressure regulator which can be used in both subminiature applications and in the various other applications.

BRIEF DESCRIPTION OF THE DRAWINGS

The drawings illustrate a preferred embodiment of the present invention with the above advantage and features and others will clearly be understood by those skilled in the art.

In the drawings.

DESCRIPTION OF THE ILLUSTRATED EMBODIMENT

Figure 1:
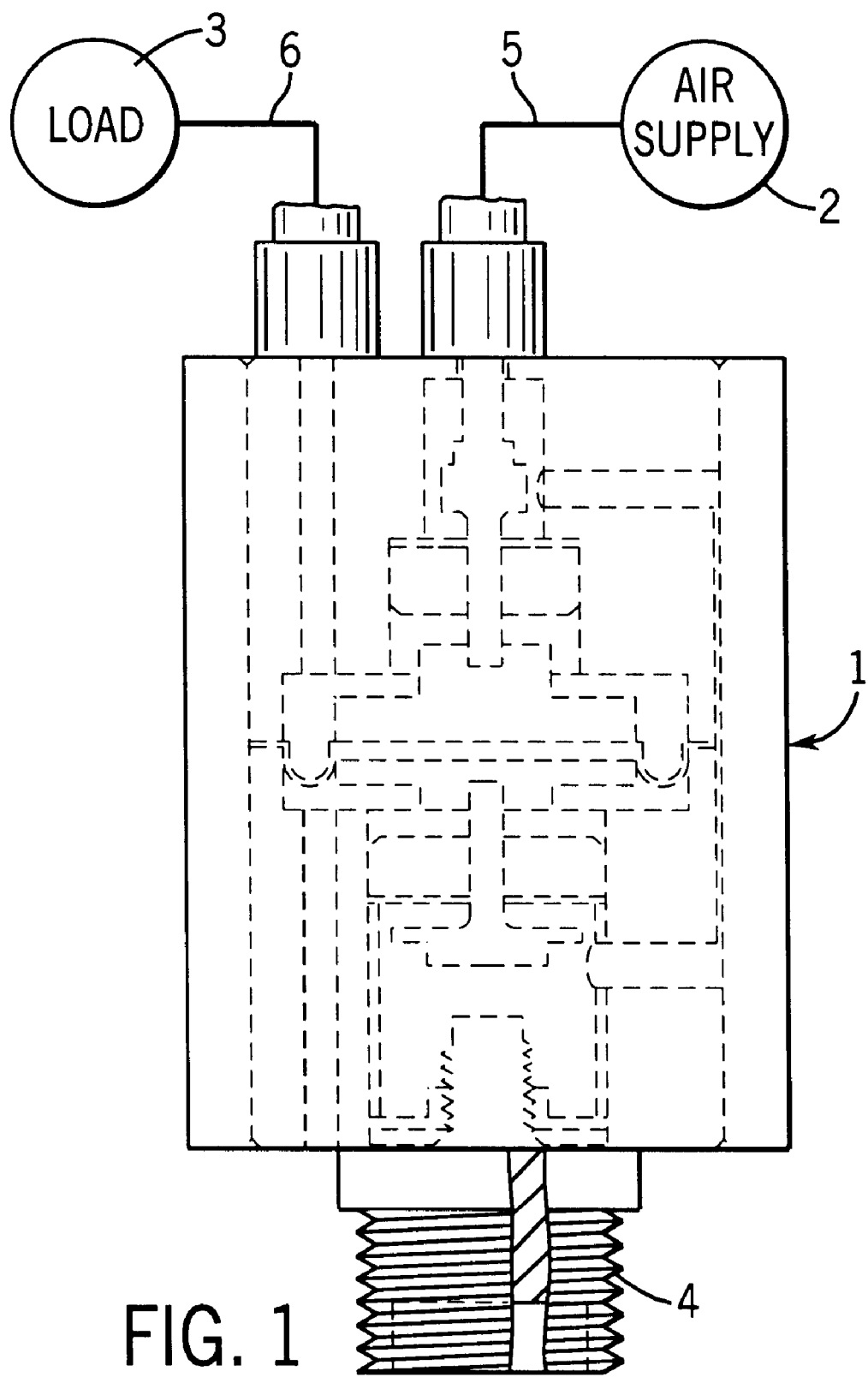
FIG. 1 is a elevational view of a subminiature pressure regulator connected between a supply source and a load device.

Referring to the drawings and particularly to FIG. 1, a pneumatic fluid system is diagrammatically illustrated including a pneumatic pressure regulator 1 connected between an air supply 2 and a load 3. The regulator 1 is mounted to a supporting structure, not shown, through a threaded coupling member 4. The single supply line 5 connects the air supply 2 to the input or supply side of the pressure regulator 1. A single output line 6 connects the output of the pressure regulator to the load 3. It may be any type of a suitable load, but is illustrated for purposes of disclosure as a typical non-bleed/nonrelieving load. A typical application may be a hydrogen fuel cell which requiring a fluid supply under selected pressure. The illustrated pressure regulator is presently described as an adjustable pressure regulator for permitting the operator to set the output pressure within a predetermined range. The supply 2 may be of any suitable source which may have a varying pressure, including container having a fixed volume and a pressure which decreases or otherwise varies from a maximum to a lower level, not less than that required by the load 3.

Figure 2:
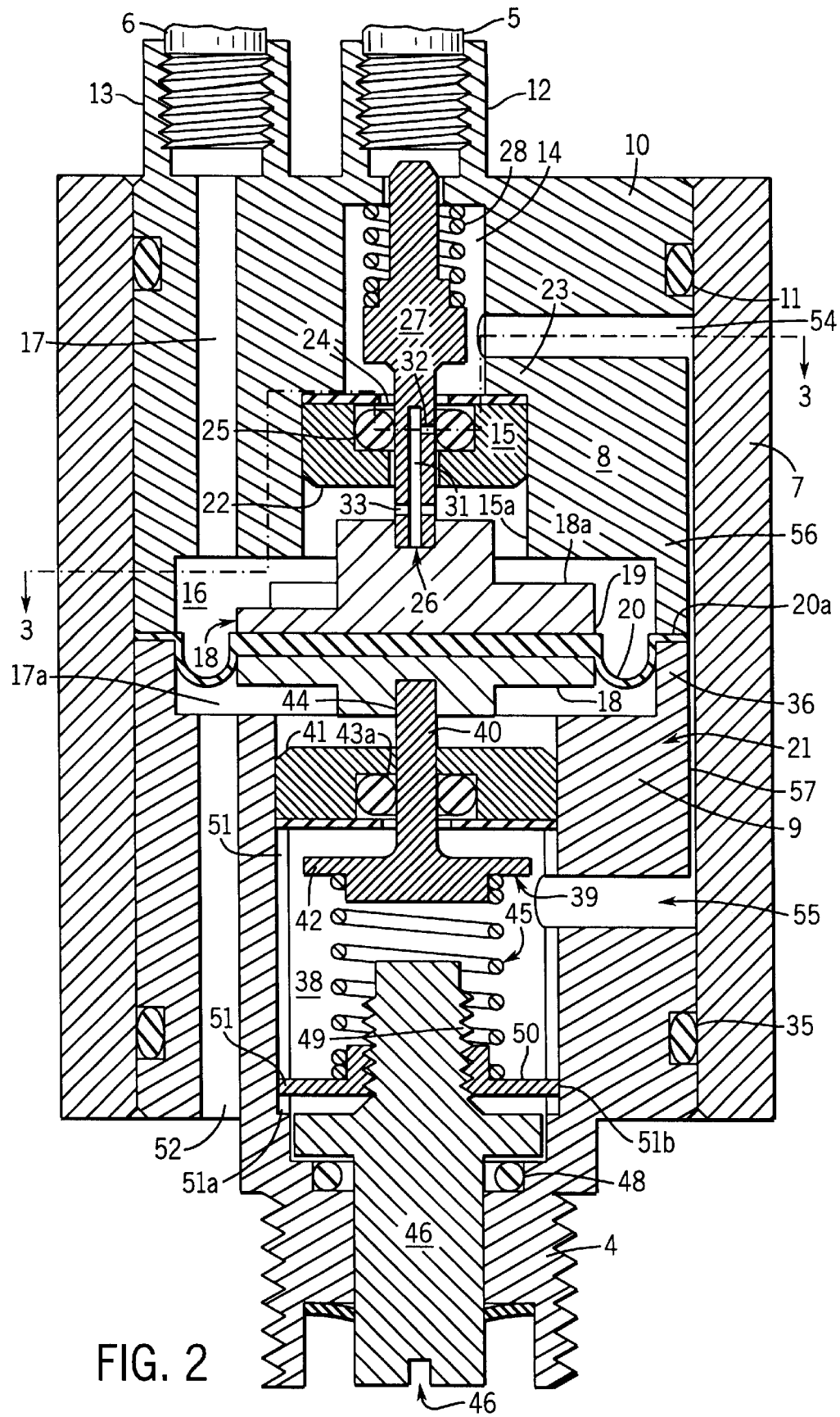
FIG. 2 is an enlarged vertical cross-sectional view of a pressure regulator shown in FIG. 1.

Referring particularly to FIG. 2, a vertical section through a pressure regulator 1 in the plane of connection to the air supply 2 and supply line 5 and the load 3 and output line 6 is illustrated. The pressure regulator 1 is illustrated as a square unit but may be round, rectangular or other desired shape. The unit includes an outer tubular housing 7. A valved assembly 8 is secured within one half of the tubular housing 7, shown in FIG. 2 as the upper half. A pressure level control unit 9 for adjusting the setting of the output pressure is secured within the lower half of the illustrated tubular housing 7 and connected to the valve assembly 8 for holding the output pressure at a selected level.

More particularly, the valved assembly 8 includes a solid body 10 telescoped within the tubular housing 7 with an annular seal 11 encircling and interposed between the solid body 10 and the tubular housing 7 adjacent the upper end of the housing. The body 10 includes the input connector 12 connected to the supply line 5 and an output connector 13 connected to output line 6. The connectors 12 and 13 may typically be tubular internally threaded connections for receiving correspondingly threaded connectors for connection with lines 5 and 6.

Supply chamber 14 is formed within the body 11 projecting inwardly from alignment with the connector 12. The inner end of the supply chamber 14 is sealed by a valve unit 15 which is located within an opening in a wall 15a between the input chamber 14 and an output chamber 16 which is formed to the opposite side of the valve unit 15 and wall 15a.

An output passageway 17 connects the output chamber 16 to the output connector 13 and thereby the output line 6. The output passageway 17 extends through the valve body 10 generally parallel to the one side of the chamber 14 and valve unit 15.

The output chamber 16 is formed to the outer side of the valve unit 15 and includes a movable outer wall unit 18, and also forming the outer wall of a reference chamber 17a. The wall unit 18 includes a flexible diaphragm 19 secured between a top plate member 18a and a bottom plate member 18b. The plates 18a and 18b have a maximum diameter less than the output chamber 16 formed within the valve body 10 and forms an open encircling portion. The diaphragm 19 includes an integral outer U-shaped encircling portion 20 extended immediately from the adjacent the walls 18a14 18b through the open encircling portion and includes a small outer flat edge wall 20a located between the outer portions of body 10 and the adjacent portion of a control body 21 of the control unit 9, as hereinafter described. The wall 20a is preferably attached to the walls as by a suitable adhesive to form a fluid tight joint.

The valve unit 15 includes a valve body 22 secured within the valve wall 15a between the output chamber 16 and the supply chamber 14. The valve body 22 is secured in place with a sealing member 23 interposed between the supply chamber 14 and valve wall 15a. Valve body 22 and sealing member 23 have a central opening 24 with an O-ring seal 25 located within a recess in the valve body 22. A valve rod 26 extends through the valve body 22 and the O-ring seal 25, and is securely connected in the illustrated embodiment at its inner or lower end within a recess or opening 26a in the top side of the movable wall 18a. The rod 26 further projects upwardly through the O-ring seal 25 and through chamber 14 into the inlet connector 12. The upper portion of rod 26 includes an enlargement 27 within the supply chamber 14. A coil spring 28 encircles the rod between the enlargement 27 and the outermost wall of the supply chamber 14 adjacent the inlet connector 12. The spring 28 guides and holds the rod 26 for guided movement within the supply chamber 14 and through the valve body 22. The secure engagement of the valve rod 26 to the wall 18a of the output chamber movable wall 18 thus provides the desired related positioning of the movable wall and the valve rod 26.

The rod 26 includes an axial opening 31 passing through the lower end portion of the rod. The axial opening 31 includes an inner lateral opening 32 aligned with the O-ring seal 25 within the valve body 22 in the closed position of the valve unit. The axial opening 31 extends downwardly through the rod to the outer end which is secured within the wall 18a. A lateral discharge opening 33 is formed within the rod connecting the axial opening 31 to the output chamber 16.

Figure 2A:
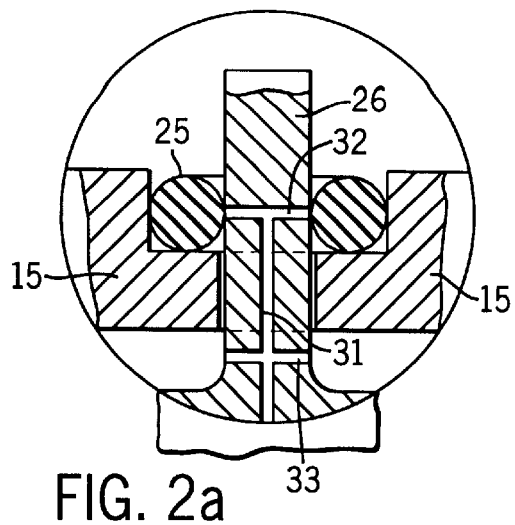
FIG. 2a is a further enlarged diagrammatic view of the valve unit shown in FIG. 2.

In the position shown in FIGS. 2 and 2a, the valve passageway is closed. The valve passageway consisting of opening 31, 32 and 33 in rod 26 is moved by movement of the movable wall 18 upwardly in FIG. 2 through the adjacent opening in the valve body 15 and member 24 the upward movement exposes the small lateral opening 32 from the O-ring seal into access with the supply chamber 14.

The position of movable wall 18 and rod 26 is controlled through the control unit 9 as follows.

The control unit 9 includes control body 21 telescoped within the tubular housing 7 and sealed therein by an O-ring seal 35 located adjacent the outer end of the housing 7. The inner end of the housing adjacent to the diaphragm is recessed to form the outer flange 36 abutting the flat edge 21 of the diaphragm 19 to secure the latter in place, as previously noted. The control body 21 is recessed at wall 18 to form the reference chamber 17a. Control chamber 38 is located centrally of the control body 21 in coaxial alignment with the valve system and the chambers of the valve unit 15. A T-shaped control member 39 has a stem rod 40 which extends upwardly through a sealed wall 41 within chamber 38. The T-shaped control member 39 thus has a flat head 42 located within the chamber 38 with the rod 40 projecting outwardly through the wall 41 and particularly through an O-ring seal member 43a within the sealed wall 41. The outer end of the rod projects outwardly and is fixedly secured to the bottom plate 18b as at 44 of the movable wall 18 to move as a unit.

A bias spring 45 is located within the chamber 38 and forms part of a bias control system in the illustrated embodiment. The bias system further includes a rotating member 46 located within the mounting connector 4 of the control body. The member 46 includes an outer end for rotating of the member 46 via an end notch 46a. The rotating member 46 extends inwardly through an O-ring seal 48 within the mounting portion 4. The inner end of the member 46 is threaded as at 49. A control flange 50 is threaded onto the member, with the bias spring 45 compressed between flange 50 and the head 42 of the member. The spring 45 is thus held in compression between the head 42 and the flange 50. The flange 50 includes side projections 51 which travel within guide channels or slots 51a and 51b in the sidewalls of chamber 38. Rotation of member 46 causes flange 50 to rotate, compressing or relieving the spring 45 to position the wall unit 18 and rod 26.

The control chamber 38 is sealed and in accordance with a significant aspect of the present invention is connected to and held at the same pressure as the supply chamber 14.

The control plate 18 and diaphragm 19 are located within the separate chamber 17a. The control rod 40 and the chamber wall are also subjected to chamber 17a, which is connected to atmosphere by the passageway 52. Thus, the return side and opening force applied to the diaphragm 19 and movable wall 18 is directly and solely related to the force of bias the spring 45, or other pressure member applied to and positioning of the control rod.

As presently described, the control rod 40 is continuously connected and subjected to the pressure in the supply chamber 14 and thus provides a pneumatic pressure balance across the units with the supply valve unit 15 in the open or closed positions. Thus, the supply pressure is applied across the control rod and as such does not tend to force the rod to any given position. The balance does however eliminate or offset the pressure applied to the valve rod during the movement of the valve rod 26 in the open position.

In the illustrated embodiment of the invention, a lateral passage 54 extends from the supply chamber 14 through the supply body 10. A similar lateral passage 55 extends through body 21 from the control chamber 3 8 to the outer housing 7. Both bodies 10 and 21 of the valve unit and the control unit have corresponding edge recesses 56 and 57 which are aligned with each other and in connection with the respective lateral passageways 54 and 55. This forms a continuous passageway from the inlet supply chamber 14 to the control chamber 38 and establishes and maintains essentially equal pressure in the two chambers for all positions of the control rod 40 and the valve rod 26.

The rotation of the control member 46 positions the threaded flange 50 within the control chamber 38 and established a compressive force on the control rod 40 for positioning of the movable wall 18. With equal pressure in the chambers 14 and 38 and a lesser pressure in the output chamber 16, when compared thereto, will result in the outward movement of the movable wall 18 and the interconnected valve rod 26. The rod movement moves the lateral passageway 32 from the O-ring seal 25 and places the passageway 31 into communication with the supply chamber 14 supplying pressurized fluid from the supply chamber 14 through the axial passageway 31 and the lateral passageways 32 and 33 into the output chamber 16. The pressure within the output chamber 16 will increase and applies a corresponding pressure to the output load 3 and the movable wall 18. As the pressure builds within the output chamber 16, it will equal the force established by the compression bias spring 45. It can then maintain such position if necessary to maintain a static condition depending upon the load characteristic. If the output pressure increases above the force of the compression bias spring 45, the movable wall 18 will be forced outwardly moving the control rod 40 and the valve rod downwardly. If the pressure is sufficiently greater, the rod passage 32 will be closed by sealed engagement with the O-ring seal 25 of the valve unit 15. The system will gradually move to the sealed off condition and eventually completely seal off the connection between the supply chamber 14 and the output chamber 16. As the output fluid is consumed, the pressure will again begin to decrease within the output chamber 16 and the system recycle with the valve unit 15 being opened until the output chamber pressure again increases to the supply pressure and thus establishes the desired output state. Thus the system will continuously recycle to establish and maintain the desired output pressure. The miniature valve unit may operate as a modulating control with the valve opening repeatedly between the opened and closed position to maintain an essentially constant pressure within the output chamber 16.

The rod structure of the above embodiment provides a highly satisfactory valve unit. Various other configurations of the rod and valve openings may be readily supplied.

Figure 4:
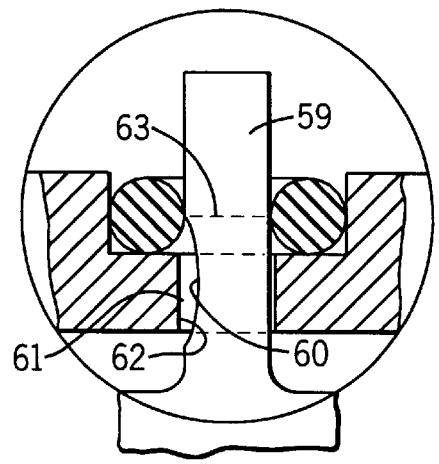
FIG. 4 is a sectional view similar to FIG. 2 of an alternate control valve.

For example, a second embodiment of the valve rod construction is illustrated in FIG. 4 having the basic structure of the valve unit 15.

In this alternate embodiment, the valve rod 59 is provided with a recess or notch 60 extending from an outermost seal end to an inner discharge end within the output chamber 16 and forming a passageway 61 within the rod and particularly between rod 59 and the valve wall 62. The recess 60 is shown as a curved unit having a relatively sharp edge 63 located in central sealing engagement with the O-ring seal 64 with the valve rod 59 forcing the unit to an upper balanced position and sealing off the supply chamber from the output chamber. Upward movement of the control rod and the valve rod as a result of the output pressure in the output chamber at a selected pressure level less than that of the supply chamber will result in the assembly moving upwardly and exposing of the upper end of the passageway 61 to the supply pressure chamber 14 and providing flow of the control fluid through the curved passageway 61 into the output chamber 16 for resetting the system to the desired output pressure. As the output pressure increases, it will again move the diaphragm valve assembly including the valve rod 59 and the control rod downwardly to a reset position and establishing the sealed position shown in FIG. 4.

Figure 5:
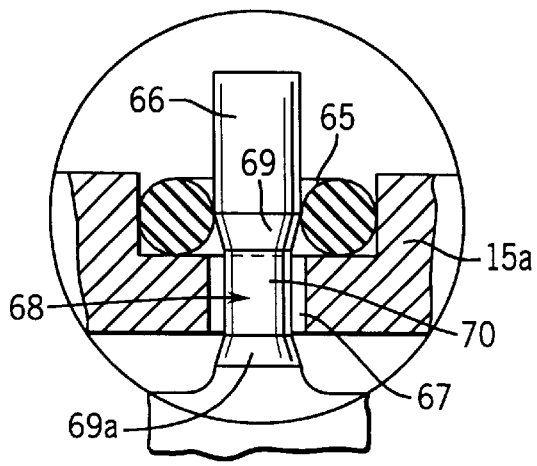
FIG. 5 is a sectional view similar to FIG. 2 of a further alternate control valve construction.

A further embodiment is shown in FIG. 5 maintaining use of an O-ring seal 65 and a control rod 66. In this embodiment, the O-ring seal 65 is again located within the recessed portion of an upper wall 15a and aligned with the opening 67 in the wall.

The control rod 66 is formed with a narrow encircling recessed portion 68, which in the closed position is aligned within the upper wall opening or passageway 67. The opposite ends of the recessed portion 68 are shown formed with a tapered configuration as at 69 and 69a to a constant diameter central portion 70 of a diameter less than the opening in the wall to form the passageway 67. As the diaphragm assembly moves upwardly, the edge of the upper tapered portion 69 moves upwardly from O-ring seal 65 exposing the passageway 67 to the supply chamber. The bottom tapered wall portion 69a permits the unit to move upwardly to a limited degree and maintain flow to the output chamber until the upward movement establishes engagement of the tapered wall with the bottom edge of the wall.

Figure 6:
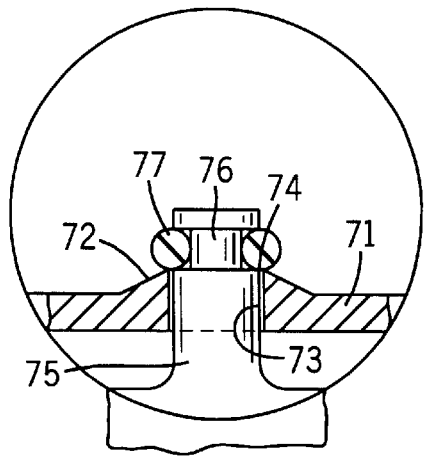
FIG. 6 is a sectional view similar to FIG. 2 of a further alternate control valve construction.
Figure 3:
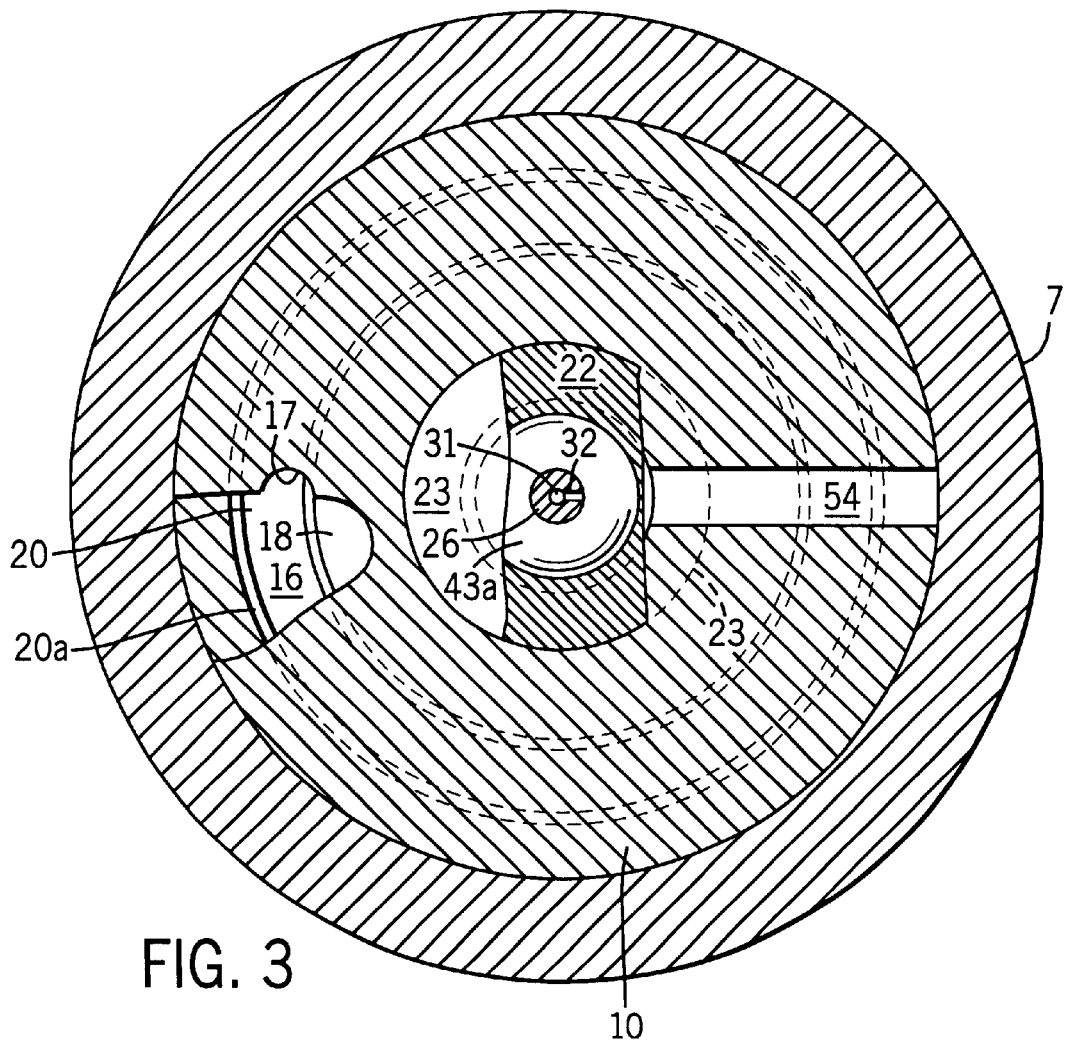
FIG. 3 is a sectional view taken generally on line 3—3 of FIG. 2.

Although the various shaped openings may advantageously be applied to the rod, a separate system may be provided using an O-ring seal attached to the rod as shown in FIG. 6. In this embodiment, the valve wall structure is formed with a top wall 71 having a conical wall 72 surrounding the rod opening 73 with an outer round sealing edge or tip 74. The upper end of the rod 75 is provided with an annular recess 76 within which an O-ring seal 77 is located. The O-ring seal 77 projects outwardly from the recess and thus in overlying relationship to the tip 74 of the conical wall 72. As the diaphragm unit is moved upwardly by the control rod, the O-ring seal 77 moves upwardly and opens the passageway beneath the O-ring seal and the tapered end of the encircling wall. This of course allows the pressurized fluid to flow downwardly from the supply chamber 14 through opening 73 into the outlet chamber 16, as in the previous embodiment.

The rod configuration with the internal passageways formed within the rod or between the periphery of the rod or wall, or even with other locations with respect therebetween provides a satisfactory and cost effective sealing system.

Other sealing systems which will provide for the controlled opening of a passageway through the movement of a controlled passageway in which a control chamber is connected to the supply chamber may of course be used within the broadest aspect of this invention. The rod and wall combination as shown herein and variations thereof provide a unique, reliable and cost effective structure.

The total assembly includes parts which are readily mass produced and assembled with a high degree of position and have been found to rely on a highly satisfactory and cost effective miniature pressure regulator. The assembly may be made of readily produced precision component having a relatively long life and produced in the desired subminiature sizes for various applications with the necessary tolerance and control.

The present invention is advantageously applied to control transfer of a fluid and particularly a pneumatic fluid for supplying of air for a hydrogen fuel cell. The control valve structure with the unique advantage of the present invention may of course be used as any fluid control valve.

Figure 7:
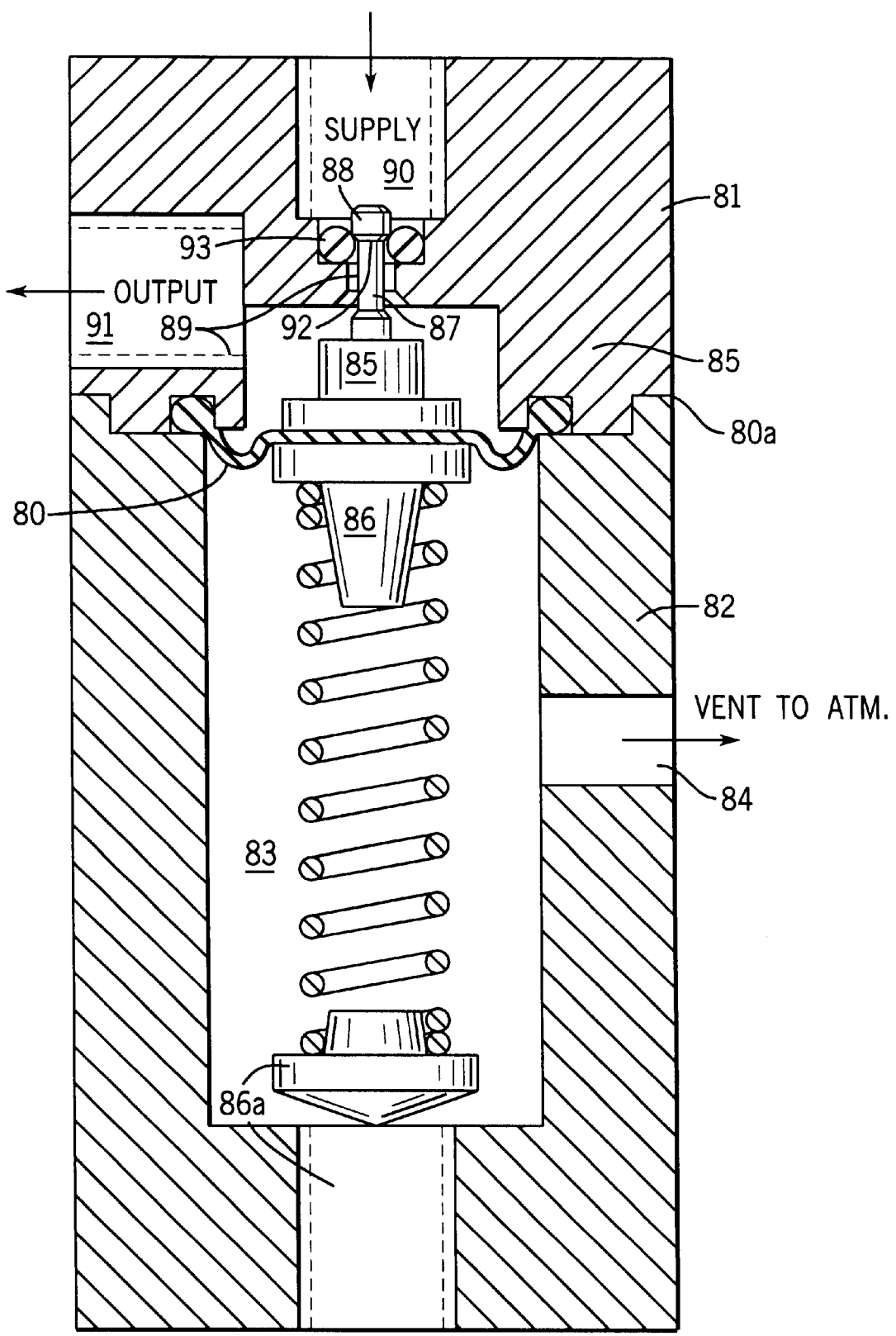
FIG. 7 is a sectional view of an alternate embodiment of the invention.

FIG. 7 illustrates an alternate embodiment on which the balance supply pressure is not provided. In FIG. 7, the diaphragm 80 is sealed as at 80a to the upper supply and valve housing member 81 and the bottom housing member 82 of a control unit 83. The control unit 83 is vented to atmosphere as at 84 in the alternate embodiment. The diaphragm 80 is secured between the movable valve body 85 and the spring-loaded positioning member 86, and is positioned to balance the supply pressure and the spring pressure in accordance with the adjustable spring setting unit 86a. The valve is illustrated as including the valve stem 87 secured to the valve body 85 and a head 88 secured within the upper end of a passageway 89 between the supply input chamber 90 and the output chamber 91. The valve head has a tapered bottom wall 92 which selectively engages an O-ring seal 93 held within the passageway 89. The operation of the simplified control valve unit of FIG. 7 is generally similar to the device shown in the first embodiment with the special formed valve assemblies, and the balanced pressure system. The embodiment of FIG. 7 can be applied when there is a minimum flow in the system and/or a small variation in the supply pressure exists. The unit of FIG. 7 may be a small unit and has been constructed in one application having a rectangular cross-section of ¾ by ¾ inches and 1½ inches in height.

In summary, the present invention provides an accurate flow control for maintaining accurate transfer of air or other fluids from a supply to an output source with the connection between the supply side of the regulator to the output side of the regulator maintaining the desired pressure compensation during essentially full transfer of the fluid to the output chamber. The rod type valve unit with an O-ring seal has provided a highly satisfactory and competitive system forming the valved sealing area of the passageway. Other passageway and seal assembly may be used in combination with the pressure compensation between the supply and the control chambers.

We claim:

1. A pressure regulator for maintaining an output pressure with varying input pressure comprising a valve assembly including a supply chamber and an output chamber separated by a valve unit, said output chamber having a movable wall, said valve unit including a valve passageway between said supply chamber and said output chamber and a movable valve member connected to said movable wall and operable to open and close said valve passageway, a control unit located adjacent said valve assembly and including a pressure control chamber including a control member within said pressure control chamber and connected to said movable wall and resiliently biasing said movable wall to place said movable valve member to open said passageway, and said output pressure being operable to reset said movable wall and said control member to close said valve passageway, and said control chamber and said supply chamber being connected to the supply to establish a corresponding balancing pressure in said control and supply chambers.

2. The pressure regulator of claim 1 including an adjustable control unit connected to the control member.

3. The pressure regulator of claim 1 including a passageway connecting said supply chamber to said control chamber.

4. The pressure regulator of claim 1 including an outer tubular housing, said valve assembly including a valve body located within one end of said tubular housing and said control body including said control chamber and located in the second end of said tubular housing, said valve body and said control body being sealed within said housing, said valve body having a lateral passageway extending from said valve chamber to the outer housing, said control unit body having a lateral passageway extending from said control chamber to said housing, said control body including aligned passageways connected respectively to said lateral passageways and thereby establishing said pressure balance passageway between said supply chamber and said control chamber.

5. The pressure regulator of claim 1 wherein said valve assembly includes a valve body having said supply chamber and said output chamber aligned and said opening connecting said supply chamber and said output chamber, said valve unit located in said opening, a control body including said control chamber and connected to said valve body, said output chamber including a movable wall adjacent said control body, said valve unit including a valve rod movable through a seal unit separating said supply chamber from said output chamber, said valve rod being connected to said movable wall, and said control chamber having an adjustable member connected to said movable wall for setting the regulated pressure.

6. The apparatus of claim 4 wherein said valve body and said control body are secured within a tubular outer housing and including a radial passageway from said supply chamber to said tubular outer housing and a lateral passageway from said control chamber to the outer tubular housing, said control chamber body and said valve chamber body having aligned recesses and abutting portions connecting said aligned passageways in the respective bodies to form said pressure balance connection between said supply chamber and said control chamber.

7. The apparatus of claim 1 wherein said valve unit includes a valve wall between said supply chamber and said output chamber, said valve member being a rod extending through the said valve wall into said input chamber and output chamber, a connection between said rod and said movable wall, said rod and said valve wall including an axial passageway having opposite ends extended between said supply and output chamber, said valve wall including a seal member engaging said rod and aligned with said passageway end at said seal member in the valve closed position, and movement of said movable wall moves the rod and the passageway unit into the supply chamber and from the seal member and thereby transferring said fluid and pressure through said axial passageway into the output chamber.

8. The apparatus of claim 7 wherein said axial passageway includes a centrally located axial passageway having a first radial passageway located at one end and a aligned with the seal member and a second lateral passageway located within said output chamber whereby movement of said rod moves said first lateral passageway into said supply chamber with said second lateral passageway located within said output chamber.

9. The apparatus claim 7 wherein said axial passageway is formed in the side wall of said valve rod with one end thereof aligned with said seal member in the closed position and moving therefrom into said supply chamber with the opposite end of said recess being continually within said output chamber.

10. The apparatus of claim 7 wherein said axial passageway is formed by a reduced diameter portion of said rod with a first end of said reduced portion aligned with said seal member in the closed position and with the opposite end of said reduced portion continuously in said output chamber.

11. The apparatus of claim 10 where the end of said passageway in alignment with said seal member is conically shaped to define a relatively sharp edge engaging said seal member and gradually opening into said reduced portion in response to movement of rod into said supply chamber.

12. The apparatus of claim 1 wherein said valve unit includes a valve wall between said supply chamber and said output chamber, said valve member being a rod extending through said valve wall into said input chamber and into said output chamber, a connection between said rod and said movable wall, said valve wall having a seal edge adjacent the rod projecting into the supply chamber, said rod having a seal member secured thereto and engaging said seal edge to close the opening in said valve wall, movement of said valve wall and rod further into said supply passageway opening the valve wall opening and connecting said supply chamber to said output chamber to transfer pressurized fluid to said output chamber.

13. The apparatus of claim 1 wherein movable valve member includes a rod member and a cooperating encircling seal member mounted for relative movement to open and close said passageway.

14. The apparatus of claim 13 wherein said rod member moves through said seal member.

15. The apparatus of claim 13 wherein said seal member is secured to said rod and is positioned relative to said valve passageway to open and close said valve passageway.

16. A pressure regulator for maintaining an output pressure with varying input pressure and/or a minimum output flow from the regulator, comprising a valve assembly including a supply chamber and an output chamber separated by a valve unit, said output chamber having a movable wall, said valve unit including a valve passageway between said supply chamber and said output chamber and a movable valve member connected to said movable wall and operable to open and close said valve passageway, a control unit located adjacent said valve assembly and including a pressure control chamber including a control member within said pressure control chamber and fixedly connected to said movable wall and resiliently biasing said movable wall to place said movable valve member to open said passageway, and said output pressure being operable to reset said movable wall and said control member to adjust the opening of and to close said valve passageway.

* * * * *